United States Patent
Heinz et al.

(10) Patent No.: US 8,394,314 B2
(45) Date of Patent: Mar. 12, 2013

(54) METHOD FOR PRODUCING A COMPONENT PROVIDED WITH A MULTIPART COVER LAYER AND SAID COMPONENT

(75) Inventors: Claus Heinz, Rheinzabern (DE); Bernhard Baumann, Lustadt (DE); Andreas Meyer, Hatzenbühl (DE); Sebastien Baumont, Bornel (FR); Godefroy Beau, La Garenne Colombes (FR); Andreas Gehring, Karlsruhe (DE); Freddy Stoof, Hornbourg-Wihr-en-Pleine (FR); Thomas Neuhard, Rumbach (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 811 days.

(21) Appl. No.: 11/909,234

(22) PCT Filed: Mar. 22, 2006

(86) PCT No.: PCT/EP2006/002944
§ 371 (c)(1),
(2), (4) Date: May 23, 2008

(87) PCT Pub. No.: WO2006/100117
PCT Pub. Date: Sep. 28, 2006

(65) Prior Publication Data
US 2008/0233359 A1  Sep. 25, 2008

(51) Int. Cl.
*B29C 65/00* (2006.01)

(52) U.S. Cl. .............. 264/511; 264/46.5; 264/275
(58) Field of Classification Search ........... 264/45.2, 264/511, 275, 245, 241, 263, 546, 46.5
See application file for complete search history.

(56) References Cited

U.S. PATENT DOCUMENTS

| 3,190,215 | A | * | 6/1965 | Howard et al. ............ 100/257 |
| 4,156,045 | A |   | 5/1979 | Burger |
| 5,945,200 | A |   | 8/1999 | Suzuki |
| 6,004,498 | A | * | 12/1999 | Fujii et al. ............ 264/255 |
| 2002/0102390 | A1 |   | 8/2002 | O'Neill et al. |

(Continued)

FOREIGN PATENT DOCUMENTS

| DE | 2253984 | 5/1973 |
| DE | 3336934 | 5/1985 |

(Continued)

OTHER PUBLICATIONS

Nakada, Nobuhiro, "Skin seal Structure of Foamed Molded Product with Skin", JP 2002-52548 A, machine translation, Feb. 19, 2002.*

*Primary Examiner* — Christina Johnson
*Assistant Examiner* — Galen Hauth
(74) *Attorney, Agent, or Firm* — Fay Kaplun & Marcin, LLP

(57) ABSTRACT

A component is produced according to the following steps: a) insertion at least of two skins into the second tool half of a tool having a cavity-forming first tool half and second tool half such that the skins overlap in their end regions; b) rear-foaming or rear-spraying of the skins with a foam material or spraying material, c) by exerting low pressure in the region of the overlap, the internally situated end region of the one skin being pressed against the externally situated end region of the other skin in a foam-tight or injection molding-tight manner.

14 Claims, 2 Drawing Sheets

U.S. PATENT DOCUMENTS

| | | | |
|---|---|---|---|
| 2003/0175467 A1* | 9/2003 | Campbell et al. | 428/61 |
| 2003/0180498 A1* | 9/2003 | De Winter et al. | 428/67 |
| 2004/0224131 A1 | 11/2004 | Cowelchuk et al. | |

FOREIGN PATENT DOCUMENTS

| | | |
|---|---|---|
| DE | 19535594 | 12/1996 |
| DE | 29823465 | 12/1999 |
| DE | 69515662 | 2/2000 |
| DE | 10044627 | 3/2002 |
| EP | 0835749 | 4/1998 |
| JP | 55107436 | 8/1980 |
| JP | 07285138 | 10/1995 |
| JP | 2002052548 | 2/2002 |
| JP | 2002052548 A * | 2/2002 |
| WO | WO 2005039857 A1 * | 5/2005 |

\* cited by examiner

METHOD FOR PRODUCING A COMPONENT PROVIDED WITH A MULTIPART COVER LAYER AND SAID COMPONENT

FIELD OF INVENTION

The invention relates to a method for the production of a component having a multipart cover layer, in particular a decorative layer, and also to a component which can be produced with the method according to the invention.

BACKGROUND INFORMATION

Interior lining parts having a cover layer which forms a decorative surface are known in the automobile industry. They are used for example as instrument panels, as door linings, as column linings or even as storage compartment covers.

It is the purpose of such components to combine desired mechanical properties with optical and even haptic properties. In order to achieve this, such a component is generally composed of a carrier which determines the mechanical properties, a foam layer which determines the haptic properties and a cover layer which determines essentially the optical properties. Components are also known which dispense with the mentioned additional foam layer, i.e. the skin is connected directly to the carrier.

Furthermore, it is known to compose covers layers from two or more skins.

However it is problematic in the case of multipart cover layers that, in the common boundary regions of the skins, foam or rear-sprayed material can emerge during rear-foaming or rear-spraying because of unsealed places and hence can reduce the quality of the surface.

A known method for foam-tight connection of skins is firstly to turn over the skins in the joint region and to sew them together in the turned-over region. The seam is then sealed in addition for the foaming process.

A further possibility for connecting skins together in a foam-tight manner is described in the publication DE 100 44 627 A1. According to the invention, two adjacent skins are connected to each other along the seam line thereof via a retaining means. In one embodiment, the retaining means is configured as a profile-like strip which clamps the adjacent skins together along the seam line. The skins connected to each other in a foam-tight manner in this way are inserted into the tool after connection with the retaining means and then are rear-foamed or rear-sprayed.

The disadvantage of these methods is that an additional method step and/or additional connection means must be used in order to connect the skins together.

The published patent specification JP 2002-052548 likewise discloses a method for the production of a component having a multipart cover layer. According to this method, two skins forming a cover layer are inserted in a tool half in such a manner that these overlap in their end regions. A rigid carrier which has a large number of adjacently disposed projections is disposed in the other tool half. The carrier is disposed thereby in such a manner that the projections protrude into the cavity. Upon closing the tool, the ends of the carrier come to be situated on the overlapping region of the skins and, in this way, press the overlapping region of the end regions of both skins together in portions. Thereafter, the cover layer is rear-foamed. By means of pressing the overlapping region together, the passage of foam is intended to be prevented during rear-foaming.

The disadvantage of this method or of this type of seal is that, on the one hand, the carrier is complex to produce because of the projections and, on the other hand, it increases in weight. Furthermore, these projections can be felt through the skins. Hence in this region, no uniform haptics are possible.

SUMMARY OF INVENTION

The present invention relates to a method for the production of a component, in particular a lining, having a rear-sprayed or rear-foamed cover layer comprising at least two skins, said method comprising, on the one hand, only a few steps in which in particular a foam- or spray-tight connection of the skins before insertion of the skins into the tool can be dispensed with, that no special configuration of the carrier is required for the purpose of producing the seal and that an almost uniform haptic effect of the component is made possible even in the boundary region of the skins. The present invention also relates to a component, e.g. a lining, which can be produced in particular with the method according to the invention and has corresponding advantages.

The method according to the invention for the production of a component in a tool having a cavity-forming first tool half and second tool half comprises the following steps: a) insertion at least of two skins into the second tool half such that the skins overlap in their end regions; b) rear-foaming or rear-spraying of the skins with a foam material or spraying material, c) by applying low pressure in the region of the overlap, the internally situated end region of the one skin being pressed against the externally situated region of the other skin in a foam-tight or injection moulding-tight manner.

There should be understood by "internally situated" end region, the end region of the one skin which, relative to the "externally situated" end region of the other skin together with which the overlap is formed, is situated lower within the cavity in the position thereof.

As a result of the fact that by applying low pressure in the region of the overlap, the internally situated end region of the one skin is pressed against the externally situated end region of the other skin in a foam-tight or injection moulding-tight manner, there is no requirement to join the two skins together in a foam- or injection moulding-tight manner already before insertion into the tool by means of an additional step, as is disclosed for example in DE 100 44 672 A1. In particular, the skins can be inserted individually.

Furthermore, no specially configured carrier is required which presses together the overlapping region of the skins during rear-foaming or rear-spraying in a foam-tight or spray-tight manner. Because of this, a carrier, if used, can be configured freely. As a result, in particular uniform haptics are possible even in the boundary region of the skins.

Almost any planar, thin-walled components, in particular the elements used in the automobile industry as typical skins, can be used as skins, for example cast skins, slush skins, for example made of PVC, injection moulded skins, for example made of PUR, multilayer composite films, leather, fabric, knitted materials etc.

Polyurethane should be mentioned here as typical material for rear-foaming, for rear-spraying, polypropylene.

It should be mentioned that also the type of introduction of the foam- or spraying material plays a role in the impermeability of the overlapping region.

Thus preferably the foam- or spraying material should be conducted first via the internally situated end region. In this way, the foam- or spraying material is prevented from opening up the overlapping region.

An advantageous development of the method provides that, by means of the low pressure, the internally situated end region of the one skin in the region of the overlap is pressed at least in regions in the direction of the surface of the second tool half.

As a result of this pressing of the internally situated end region in the direction of the tool surface, the externally situated end region of the other skin is pressed together between the internally situated end region and the tool surface. By pressing together the internally situated end region and externally situated end regions, the overlap of the end regions can be sealed in a foam-tight or injection moulding-tight manner.

A further advantageous development of the method provides that the externally situated end region of the one skin has continuous openings in the overlapping region for transferring the low pressure to the internally situated end region of the other skin.

Through the continuous openings in the externally situated end region of the one skin, the low pressure can be transferred effectively to the internally situated end region of the other skin, as a result of which it is possible to seal a possible gap between the two end regions effectively.

The openings can have different geometries, for example with round openings, square openings or be configured as slots. In order to have a sealing effect along the entire overlap of the end regions, openings of this type are preferably distributed along the entire course of the region to be sealed.

If a high level of sealing is required for the overlap, then the spacings between the individual openings along the course of the overlap are chosen to be as small as possible. This possibility of being able to choose the spacings of the openings to be very small distinguishes the present invention in particular from the printed patent specification JP 2002-052548. According to the invention disclosed there, the webs which press together the overlapping end regions have a specific minimum spacing in order not to impede the foaming process too greatly, in particular the foam flow.

Pressures in particular in the region of 0.05 bar to 0.3 bar are suitable for the level of the low pressure for pressing the end regions together.

An advantageous development of the invention provides that a low pressure is exerted in the region of the edge of the externally situated end region of the one skin.

Preferably, the low pressure in the region of the edge of the externally situated end region is exerted along the entire course of the overlap to be sealed. As a result, a uniform, uninterrupted sealing effect can be achieved. In contrast thereto, the end regions for example in the already mentioned printed patent specification JP 2002-052548 are pressed together only in portions, hence the sealing effect varies.

A particularly high sealing effect can be achieved if a low pressure is applied both in the region of the edge of the externally situated end region and at the openings, as described above, in the externally situated end region. Both variants can however also be used separately, A further advantageous development of the method provides that the end regions of the skins are melted together at least in regions after insertion of the skins into the second tool half.

Basically, a durable stable connection of the end regions is no longer necessary because of the effect of the rear-foamed or rear-sprayed material which can likewise fix the skins. Nevertheless, it can be sensible to connect the end regions of both skins to each other in addition, for example in order to improve the optics. According to the invention this is achieved by melting the end regions. There should be understood here by melting also melting, in regions, of at least one of the surfaces of an end region which is in contact with the oppositely situated end region.

Melting of the end regions can be achieved for example by exerting sufficiently high pressure when pressing together the end regions, by additional heating of the end regions before insertion into the tool or in the inserted state, for example by heating the tool and/or by the heat of the foam material or spraying material.

Basically the possibilities are of course maintained of gluing the end regions subsequently, welding them, clamping or connecting them to each other in another manner.

A further advantageous development of the method provides that at least one of the skins is a thermoplastic material.

This is sensible in particular when the end regions of the two skins are intended to be melted together. In this case, even already solidified skins can still be connected to each other.

For example thermoplastic elastomers, thermoplastic olefins, mixtures of PVC and ABS, ASA and mixtures of PVC and ASA are suitable as materials.

A further advantageous development of the invention provides that the skins are formed in their overlapping region in such a manner and are disposed in such a manner that the latter are pressed together by the pressure of the foam material or spraying material during the rear-foaming or rear-spraying.

An overlap of skins which is not held together by external means is generally opened up during rear-foaming or rear-spraying by the spreading foam- or spraying material.

According to the invention, it is now provided to deform the skins geometrically in their overlapping region, in particular the internally situated end region of the one skin such that opening up of the overlap is prevented, preferably the pressure of the introduced foam- or spraying material can be used for pressing together the overlapping end regions.

According to the invention, it is preferred that the internally situated end region of the one skin has an inclined sealing lip in the edge region.

As a result of this inclined sealing lip, the foam- or spraying material introduced into the tool has no contact point: the material is conducted over the internally situated end region as a result of the inclination. On the internally situated end region, a force is likewise exerted which presses the internally situated end region against the externally-situated end region.

A further advantageous development of the method provides that at least one of the skins has a recess which abuts against the surface of the oppositely situated skin in the overlapping region for receiving foam material or spraying material which could possibly penetrate into the overlapping region.

A further advantageous development of the method provides that a carrier is disposed in the first tool half and, by closing the tool, the carrier is brought in contact in a planar manner with the internally situated end region of the one skin in the region of the overlapping region.

As a result of being brought into contact in this way, pressure can be exerted in addition on the internally situated end region by means of which the internally situated end region and the externally situated end region are pressed together.

Preferably, the carrier is, in an uninterrupted manner along the entire overlapping region to be sealed of the skins, in contact in a planar manner with the internally situated end region of the one skin.

It is preferred according to the invention in this context that, in the second tool half on the surface thereof in the region of the overlap of the skins, an element which can be changed in its expansion and extends along the overlapping region is provided, preferably an elastic hose and, by means of this element, the overlapping region is pressed against the carrier.

This represents a further possibility for increasing the seal of the overlap.

Furthermore, the present invention discloses a component, in particular a component produced with the method according to one of the claims 1 to 10, having at least two adjacently disposed skins which overlap in their end regions, and having a foam layer or injection moulding layer situated behind the skins, the externally situated end region of the one skin having continuous openings in the region of the overlap.

A component of this type can be used for example as interior lining part, for example as an instrument panel or door lining of an automobile.

A further development of the component provides that the internally situated end region of the one skin has an inclined sealing lip in the edge region of the end region.

A further advantageous development of the component provides that at least one of the skins has a recess in the overlapping region which abuts against the surface of the oppositely situated skin.

A further advantageous development of the component provides that the component has a carrier which touches the internally situated end region of the one skin in the region of the overlap in a planar manner.

Preferably, the carrier is in contact with the internally situated end region in an uninterrupted planar manner in the entire course of the region to be sealed of the overlap.

BRIEF DESCRIPTION OF DRAWINGS

The invention is now explained in more detail with reference to embodiments which are represented partially by drawings. There are thereby shown:

FIG. 1 shows a first embodiment of a component according to the invention, here an interior lining part of an automobile, in a cross-sectional view, which can be obtained according to a first embodiment of the method according to the invention.

DETAILED DESCRIPTION

Figure 1:
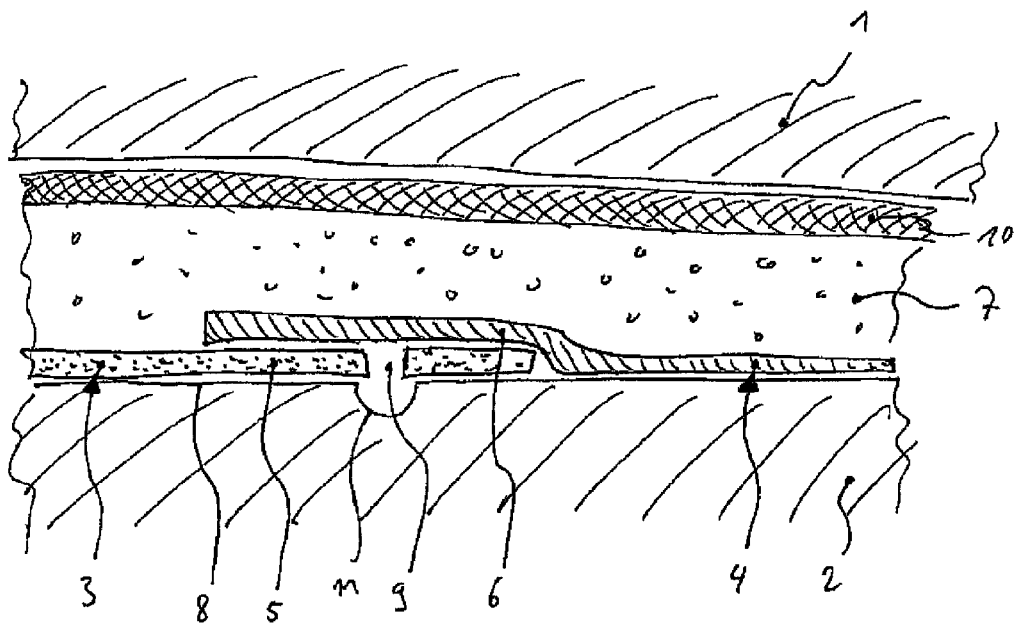
FIG. 1 a first embodiment of a component according to the invention and a first embodiment of a method according to the invention in the state after conclusion of the rear-foaming process.

The component contains two adjacently disposed skins 3, 4 which overlap in their end regions 5, 6, a foam layer 7 situated behind the skins and a rigid carrier 10 which carries foam layer 7 and skins 3, 4. The skins 3, 4 which both comprise the same thermoplastic material but have different colours form a two-coloured cover layer of the component. The externally situated end region 5 of the one skin 3 has continuous openings in the region of the overlap. These openings are square and distributed uniformly along the entire course of the overlap of the two end regions 5 and 6.

According to the first embodiment of the method according to the invention, in a tool with a cavity-forming first tool half 1 and second tool half 2, two skins 3, 4 are firstly inserted into the second tool half 2 such that the skins overlap in a planar manner in their end regions 5, 6. The externally situated end region 5 of the one skin 3 has continuous openings 9 described above in the overlapping region for transferring a low pressure to the internally situated end region 6 of the other skin 4.

Via a channel 11 in the second tool half 2 which is disposed in the surface of the second tool half in such a manner that it extends directly below the openings 9 of the externally situated end region (and hence situated directly on the surface 8 of the second tool half), a low pressure is exerted. As a result of this low pressure, the internally situated end region 6 of the one skin 4 is pressed in the region of the overlap in the direction of the surface 8 of the second tool half. The externally situated end region 5 is pressed together as a result between the tool surface 8 and internally situated end region 6. Because of the counter-pressure of the surface 8 of the rigid second tool half, the internally situated region 6 of the one skin 4 is as it were pressed against the externally situated end region 5 of the other skin 3 in a foam-tight manner.

In the first tool half, a rigid carrier 10 is disposed in a further step.

Thereafter, a foam material is introduced into the tool, the tool is closed and the foaming process begun.

FIG. 1 represents the state of the method after conclusion of the foaming process.

Figure 2:
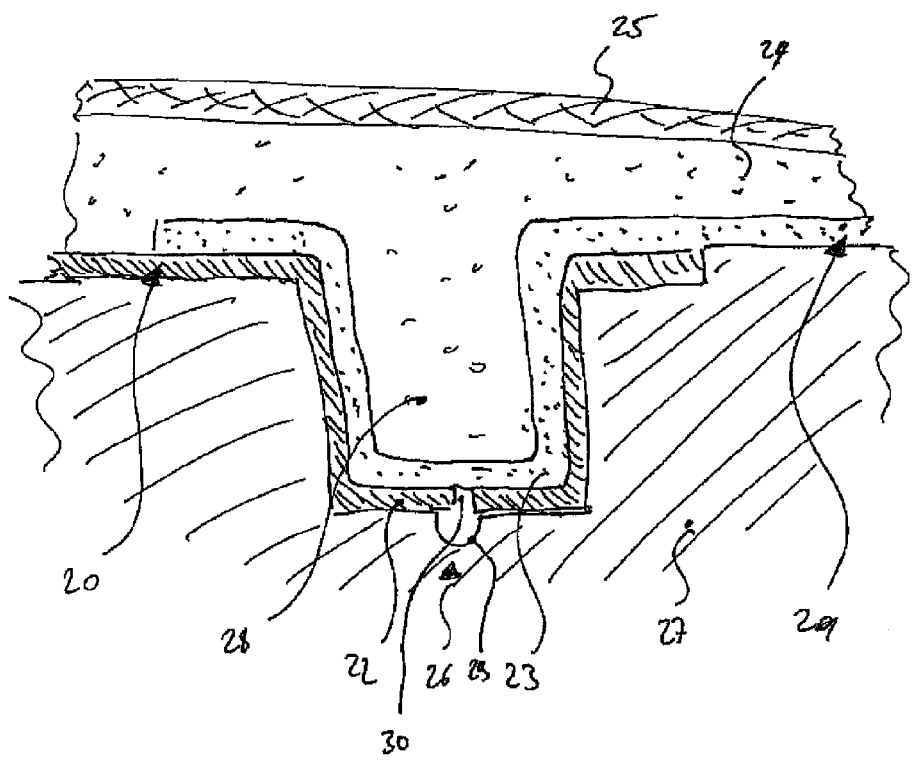
FIG. 2 a second embodiment of a component according to the invention and of a method according to the invention.

FIG. 2 shows a second embodiment of a component according to the invention and also a second embodiment of a method according to the invention.

The second embodiment of the component according to the invention has two adjacently disposed skins 20, 21 which overlap in their end regions 22, 23, a foam layer 24 situated behind the skins 20, 21 and a rigid carrier 25 which carries the foam layer 24 and skins 20, 21. Furthermore, the externally situated end region 22 of the skin 20 has continuous openings 30 in the region of the overlap. The openings are configured as described in the first embodiment.

In contrast to the first embodiment, the end regions 22, 23 of the two skins 20, 21 are angled-over in their overlapping region in the form of a rectangular web 26, both end regions 22, 23 extending with their edges beyond the web 26.

According to the second embodiment of the method according to the invention, two skins 20, 21 are firstly inserted into the second tool half in a tool having a cavity-forming first tool half (not shown) and second tool half 27 such that the skins overlap in their end regions 22, 23.

The second tool half 27 has a groove 28, rectangular in profile, on its surface. On the base of the groove 28 there is situated a channel 29, via which a low pressure can be exerted.

Both skins 20, 21 are inserted into the second tool half in such a manner that the end regions 22, 23 of the skins follow the shape of the groove 28. The externally situated end region 22 has openings 30 described already above, which are made congruent with the channel 29 in the base of the groove 28 of the second tool half 27.

Thereafter, the method is continued analogously to the method of the first embodiment.

As a result of the fact that the overlapping end regions have an angled-over course, the sealing effect is particularly high since the angled-over places form an obstacle for penetration of foam or spraying material. Basically also angled-over shapes other than those presented here can be used. Such configurations of the end regions can be configured in the finished component for example as a trim.

In both embodiments, the respective skins are thermoplastic materials which have been preheated before insertion. During the foaming process, the skins 3, 4 or 20, 21 were melted together by heating the tool and with the additional influence of the hot foam material.

Figure 3:
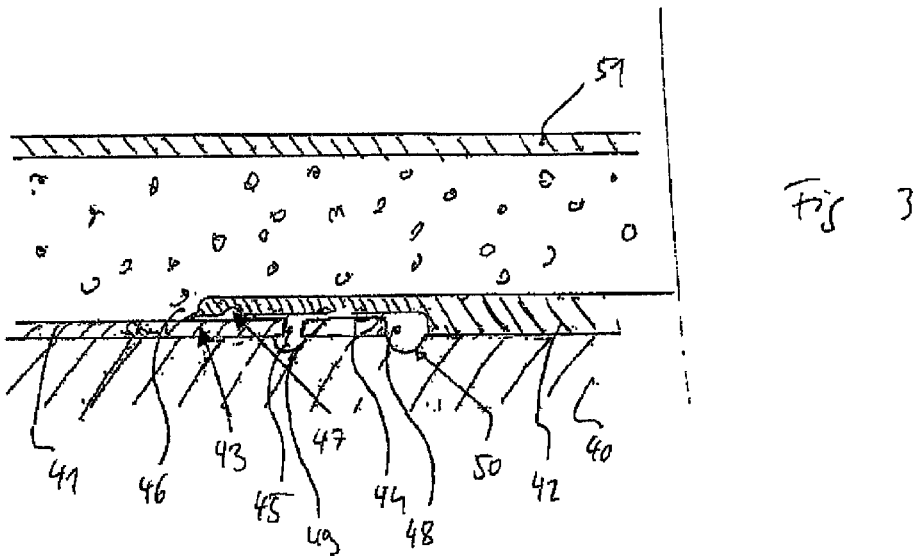
FIG. 3 a third embodiment of a component according to the invention and a third embodiment of a method according to the invention in the state after conclusion of the rear-foaming process.

FIG. 3 shows the state of a third embodiment of a method according to the invention after conclusion of the foaming process and also a third embodiment of a component according to the invention.

According to the third embodiment of the method according to the invention, in a tool with a cavity-forming first tool half (not shown) and second tool half 40, two skins 41, 42 are firstly inserted such that the skins overlap in a planar manner in their end regions 43, 44.

Furthermore, the externally situated end region 43 of the skin 41 has continuous openings 45 in the overlapping region for transferring the low pressure to the internally situated end region 44 of the skin 42. These openings are configured corresponding to the openings described in the first embodiment.

The internally situated end region 44 has an inclined sealing lip 46 in the edge region. The sealing lip 46 extends along the entire overlap of the two skins 41, 42.

Furthermore, the internally situated end region 44 has a recess 47 which abuts against the surface of the oppositely situated end region 43 in the overlapping region for receiving foam which could possibly penetrate into the intermediate region of the two end regions.

The skin 42, except for the internally situated end region 44, is thicker than the end region 43 of the skin 41. In its end region 44, the skin 42 is formed as a step, the height of the step corresponding to the thickness of the end region 43 of the skin 41. The end regions 43, 44 overlap because of this without buckling of the skin 42 in the overlapping region.

A step of this type has the advantage that the end regions of the adjacent skins are situated one upon the other in a planar manner in the region of the overlap solely because of their special form, in particular without additional pressing means.

Furthermore, the skins 41, 42 are disposed such that a free space 48 remains between the edge, slightly offset, of the externally situated end region 43 and of the step of the skin 42.

The second tool half 40 has two channels 49, 50, via which a low pressure can be exerted, on its surface. The channels 49, 50 are disposed in such a manner that the channel 49 comes to be situated directly under the opening 45 of the externally situated end region 43, and the channel 50 under the free space 48 between the edge of the externally situated end region 43 and the step of the skin 42.

In the following step of the method, a low pressure is exerted via the channels 49, 50 which presses the internally situated end region 44 together against the externally situated end region 43 in a foam-tight manner.

In the first tool half, a carrier 51 is disposed. Thereafter, a foam material is introduced into the tool, the tool is closed and the foaming process begun.

During the rear-foaming process, the seal of the overlap of the end regions 43, 44 is ensured by the low pressure. Furthermore, the inclined sealing lip 46 on the edge of the end region 44 contributes as a result of its geometric form to the foam mass not opening up the overlap, on the one hand, during the flow process and, on the other hand, the two end regions, 43, 44 are pressed together.

FIG. 3 shows the state of the method after conclusion of the foaming process.

Thereafter, the tool can be opened and the component removed.

As an alternative, the method according to the invention can be effected without a sealing lip 46 being configured, without a recess for receiving foam 47 and without continuous openings in the externally situated end region 43, as a result of which the sealing effect is produced essentially by exerting low pressure in the free space 48. Likewise the configuration of the free space 48 could also be dispensed with. Furthermore, the free space 48 can also be formed in another way, for example by means of an inclination of the skin 42 in the region of the edge of the externally situated end region 43, as represented for example in FIG. 1. Also the sealing lip 46 and the receiving means 47 can be used independently of each other. The different components can be used in various combinations.

Figure 4:
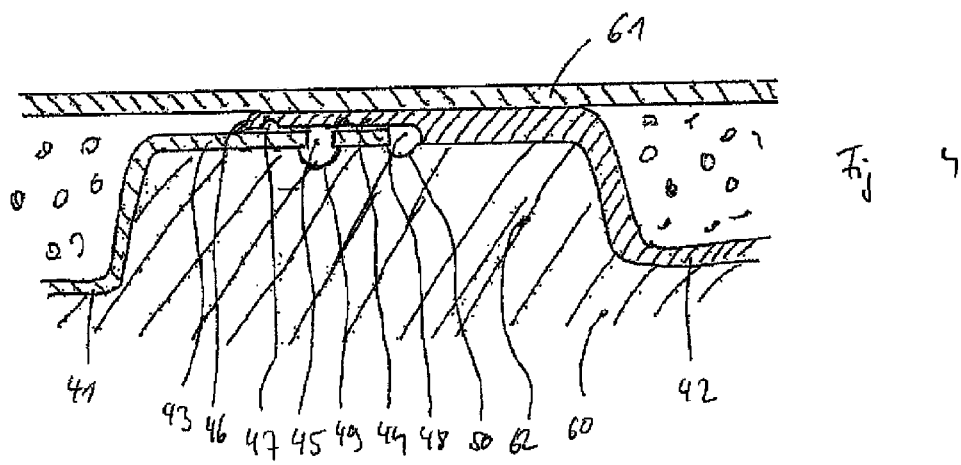
FIG. 4 a fourth embodiment of the component according to the invention and a fourth embodiment of a method according to the invention in the state after conclusion of the rear-foaming process.

FIG. 4 shows the state of a fourth embodiment of a method according to the invention after conclusion of the rear-foaming process and also a fourth embodiment of a component according to the invention.

According to the fourth embodiment of the method according to the invention, two skins 41, 42 are disposed in a second tool half 60 analogously to the third embodiment. The skins 41, 42 are configured with characteristics described in the third embodiment, in particular they have a sealing lip 46, a recess 47, a continuous opening 45 and a free space 48 (the indices were correspondingly maintained).

Correspondingly, the second tool half 60 has two channels 49, 50 for exerting a low pressure on the internally-situated end region 44.

Deviating from the third embodiment, the second tool half 60 has a web 62 in the region of the overlap of the end regions 43, 44. The web 62 is dimensioned such that exactly the space remains for the arrangement of a carrier 61 between the surface of the first tool half and the surface of the overlap.

According to the fourth embodiment of the method according to the invention, the skins 41, 42 are firstly inserted into the second tool half in the above-described manner. Thereafter, a carrier 61 is disposed in the first tool half. Thereafter, a foam material is introduced on both sides of the web 62 of the second tool half 60. The tool is closed. By closing the tool, the carrier 61 is brought in contact in a planar manner with the internally situated end region 44 of the one skin in the region of the overlapping region.

In this embodiment, the web 62 is configured in such a manner that the carrier 61 is in contact in a planar and uninterrupted manner with the internally situated end region 44 over the entire overlapping region of the end regions 43, 44. In this way, the seal in the region of the overlap of the end regions 43, 44 is additionally reinforced.

The component produced with this method, in addition to the features of the component of the third embodiment, has a carrier which touches the internally situated end region 44 of the one skin 42 in a planar manner in the region of the overlap.

Figure 5:
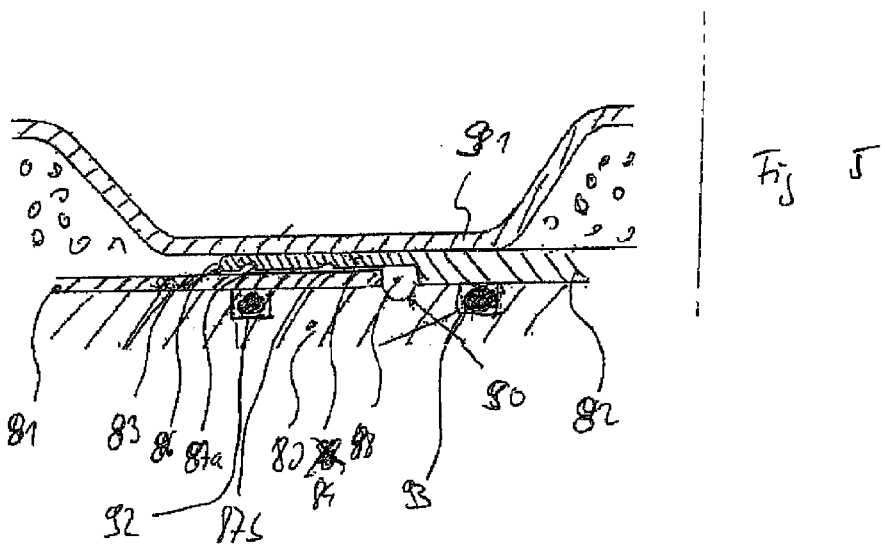
FIG. 5 a fifth embodiment of a method according to the invention after conclusion of the rear-foaming process.

FIG. 5 shows the state of a fifth embodiment of a method according to the invention after conclusion of the foaming process.

According to the fifth embodiment of the method according to the invention, two skins 81, 82 are inserted into the second tool half 80 of a tool with a cavity-forming first tool half (not shown) and second tool half 80.

The edge of the internally situated end region 84 in the third embodiment has an inclined sealing lip 86, a recess 87*a* which abuts against the surface of the oppositely situated externally situated end region 43 and a stepped shape which is produced by a varying thickness. In addition, a further recess 87*b* which is situated opposite the surface of the externally situated end region but laterally offset relative to the first recess 87*a* is provided.

The externally situated end region 83 (in contrast to the end region 43 of the third embodiment) is continuous, i.e. without openings.

The skins 81 and 82 are disposed slightly offset on the tool surface of the second tool half so that a free space 88 is formed between the edge of the externally situated end region 83 and the step of the skin 82.

The second tool half has a channel 90 on its surface for exerting a low pressure, said channel being situated directly below the free space 88 between the two skins 81, 82.

According to the fifth embodiment of the method according to the invention, a carrier is disposed in the first tool half 91 after insertion of the skins 81, 82 into the second tool half 80. The carrier in the region which is situated opposite the overlap of the end regions 84, 83 is configured in the form of a raised portion. The form of the raised portion is of such a type that, upon closing the tool, the carrier 91 comes into contact in a planar manner with the surface of the internally situated end region 84 over the entire course of the overlap.

Furthermore, the second tool half 80 has, on its surface in the region of the overlap of the skins 81, 82, inflatable elastic sealing hoses 92, 93 which are disposed in a groove on both sides of the channel 90 for applying an excess pressure. By inflating the sealing hoses 92, 93, it is possible to press an overlap of the skins 81, 82 against the oppositely situated carrier 91.

According to the method according to the invention, a low pressure is applied in the region of the overlap after insertion of the skins 81, 82 and of the carrier 91 via the channel 90 and the internally situated end region 84 is pressed against the externally situated end region 83 in a foam-tight manner. Thereafter, a foam material is introduced into the tool and the tool is closed. By closing the tool, the carrier 91 is brought in contact with the surface of the internally situated end region 84 in a planar manner. Thereafter, the elastic sealing hoses 92, 93 are inflated, as a result of which the overlapping region is pressed in addition against the carrier 91. As a result, the sealing of the overlap can be ensured very effectively.

Alternatively, continuous openings can be provided in addition in the externally situated end region 83 which penetrate the skin 81 analogously to the first four embodiments in order to increase the seal further by exerting a low pressure at these openings.

Alternatively, instead of sealing hoses, also for example slides can be used.

Alternatively, a sealing lip 86 and receiving means 87a, 87b can possibly be dispensed with.

The embodiments relate exclusively to rear-foaming processes or components with a rear-foamed cover layer. Alternatively, the method according to the invention can also be implemented analagously in an injection moulding tool with rear-spraying of the skins. The components have correspondingly an injection moulding layer which is situated behind the cover layer formed by the skins.

The invention claimed is:

1. A method for a production of a component in a tool having a cavity-forming first tool half and a second tool half including at least a first channel and a second channel, comprising:
    a) inserting at least a first skin and a second skin into the second tool half such that the first skin and the second skin overlap in their end regions and such that the first channel and the second channel of the second tool half lie across from the overlap, wherein the second skin comprises an externally situated end region, which includes at least one skin opening;
    b) one of rear-foaming and rear-spraying of the first skin and the second skin with one of a foam material and a spraying material,
    c) exerting a first low pressure in a region of the at least one skin opening through the first channel to pressure an internally situated end region of the first skin against the externally situated end region of the second skin in one of a foam-tight manner and an injection moulding-tight manner; and
    d) exerting a second low pressure in an edge region between an edge of the externally situated end region and the internally situated end region through the second channel.

2. The method according to claim 1, wherein using the first low pressure, the internally situated end region of the first skin in the region of the overlap is pressed at least in regions in a direction of a surface of the second tool half.

3. The method according to claim 1, wherein the externally situated end region of the second skin has continuous openings in the overlapping region for transferring the first low pressure to the internally situated end region of the first skin on which the first low pressure is exerted.

4. The method according to claim 1, wherein the end regions of the first skin and the second skin are melted together at least in regions after insertion of the first skin and the second skin into the second tool half.

5. The method according to claim 1, wherein at least one of the first skin and the second skin is composed of a thermoplastic material.

6. The method according to claim 1, wherein the first skin and the second skin are formed in their overlapping region in such a manner and are disposed in such a manner that the latter are pressed together by the pressure of one of the foam material and the spraying material during one of the rear-foaming and the rear-spraying.

7. The method according to claim 6, wherein the internally situated end region of the first skin has an inclined sealing lip in an edge region.

8. The method according to claim 1, wherein the first skin has a recess which abuts against the surface of the oppositely situated second skin in the overlapping region for receiving one of the foam material and the spraying material.

9. The method according to claim 1, further comprising:
    disposing a rigid carrier in the first tool half; and
    closing the tool to bring the carrier in contact in a planar manner with the internally situated end region of the first skin in the region of the overlapping region.

10. The method according to claim 9, further comprising:
    on the surface of the second tool half in the region of the overlap of the first skin and the second skin, providing an expandable element along the overlapping region; and
    pressing the overlapping region against the carrier by means of the element.

11. The method according to claim 10, wherein the element is an elastic hose.

12. The method of claim 1, further comprising:
    disposing a rigid carrier in the first tool half; and
    inserting the one of a foam material and a spraying material between the first skin and the second skin and the carrier.

13. A method for a production of a component in a tool having a cavity-forming first tool half and a second tool half including at least a first channel and a second channel, comprising:
    a) inserting at least a first thermoplastic skin and a second thermoplastic skin into the second tool half such that the first thermoplastic skin and the second thermoplastic skin overlap in their end regions and such that the first channel and second channel of the second tool half lie across from the overlap;
b) one of rear-foaming and rear-spraying of the first thermoplastic skin and the second thermoplastic skin with one of a foam material and a spraying material; and
c) exerting a low pressure in a region of the at least one skin opening through the first channel to pressure an internally situated end region of the first thermoplastic skin against the externally situated end region of the second thermoplastic skin in one of a foam-tight manner and an injection molding-tight manner, where the internally situated end region and the externally situated end region are attached to each other by heating the second tool half.

14. The method according to claim 13, wherein the heating of the tool half and the exerting of the low pressure overlap in time.

* * * * *